Figure 1:
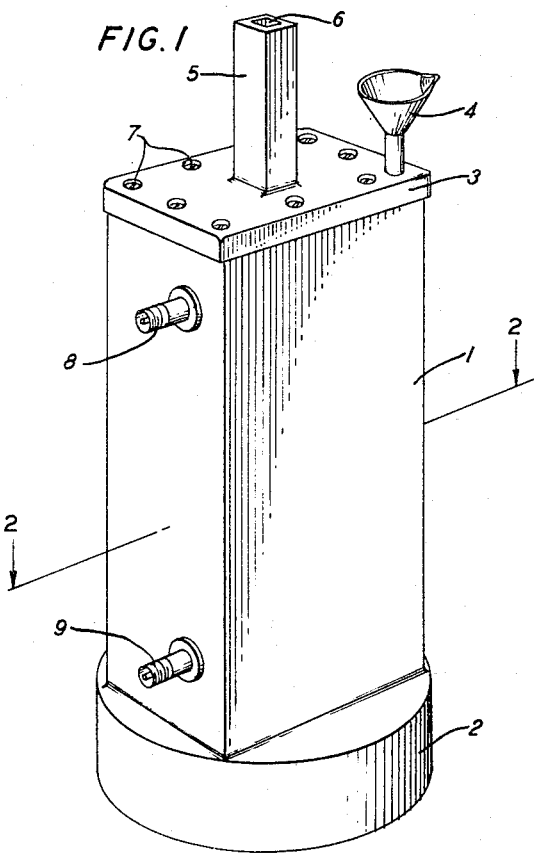

May 21, 1968 H. E. STINEHELFER 3,384,814
RIDGE WAVEGUIDE RESONANT CAVITY FOR MEASURING
DIELECTRIC CONSTANTS
Filed Sept. 25, 1963 3 Sheets-Sheet 1

INVENTOR
H. E. STINEHELFER
BY
Walter M. Hill
ATTORNEY

May 21, 1968 H. E. STINEHELFER 3,384,814
RIDGE WAVEGUIDE RESONANT CAVITY FOR MEASURING
DIELECTRIC CONSTANTS
Filed Sept. 25, 1963 3 Sheets-Sheet 2
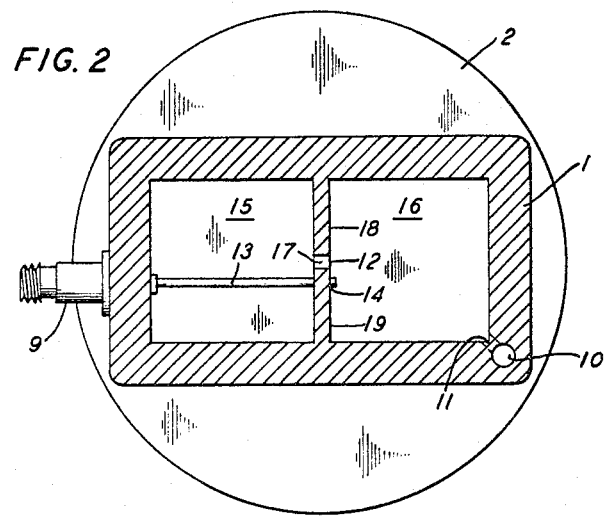
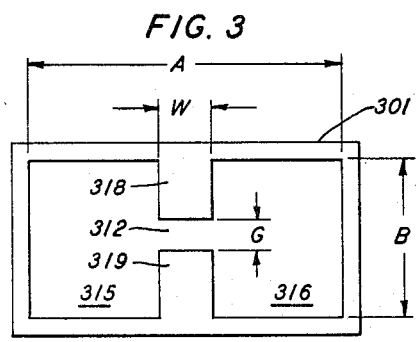
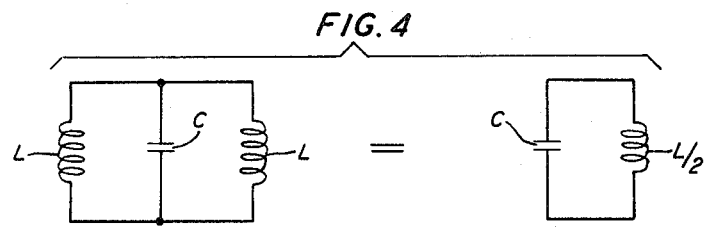

United States Patent Office 3,384,814
Patented May 21, 1968

3,384,814
RIDGE WAVEGUIDE RESONANT CAVITY FOR MEASURING DIELECTRIC CONSTANTS
Harold E. Stinehelfer, Livingston, N.J., assignor to Bell Telephone Laboratories, Incorporated, New York, N.Y., a corporation of New York
Filed Sept. 25, 1963, Ser. No. 311,588
6 Claims. (Cl. 324—58)

This invention relates to the art of electrical measurements and more particularly to a means for measuring the dielectric properties of solid dielectric materials.

It has become increasingly important in the fabrication of printed circuit structures operating at very high frequencies to know the dielectric properties of the substrate material with greater certainty and to maintain control over these dielectric properties during manufacture. In many instances it is very important that the dielectric constant be known for all three axes of the substrate material since it has been found that many of these materials are quite anisotropic.

The resonant cavity method of determining dielectric constants has been known for some years and one embodiment involving a cylindrical cavity and a cylindrical test specimen is described on page 660 in vol. 11 of the Radiation Laboratory Series; Montgomery; "Technique of Microwave Measurements." A description of a method for the determination of the loss tangent will also be found in this publication on page 662. The cylindrical cavity resonator, however, is incapable of determining anisotropy. Other cavities have been described in an article entitled "Resonant Cavities for Dielectric Measurements" found on page 605 of the Journal of Applied Physics, vol. 18, July 1947, and in an article entitled "Microwave Dielectric Measurements" found on page 789 in the Journal of Applied Physics, vol. 18, September 1947. The physical structure of all of these is satisfactory for laboratory use by skilled scientists or laboratory technicians but is not practical for routine factory inspection purposes. The operation of the present invention is very simple, takes very little time and both the preparation of the test specimens and the testing procedures can be performed by relatively unskilled personnel.

It is an object of this invention to measure the dielectric properties of solid dielectric materials.

A further object of this invention is to measure the dielectric properties of solid dielectric materials without substantial waste of the material to provide the test specimens.

A still further object of this invention is to measure the dielectric properties of solid dielectric materials in all three of their orthogonal axes in order to determine the degree of anisotropy.

The foregoing objects are achieved by this invention which comprises a resonant cavity operating in the $TE_{10}$ mode constructed from a section of ridge waveguide having a length approximating an integral number of one-half waveguide wavelengths. The dimensions of the gap between the ridges as well as those of the two cavity chambers are such as to cause the test frequency to remain between the cross section cutoff frequency and the self-resonant frequency of the $TE_{20}$ mode. The cavity is filled with a suitable dielectric liquid, preferably a liquid silicone, and a hole in an end wall permits insertion of a test specimen in the gap between the ridges. The cavity is excited at its resonant frequency and the resonant frequency and amplitude are measured by conventional means. The dielectric constant is determined directly from the change in resonant frequency resulting from inserting the specimen while the loss tangent is obtained by a conventional method involving the width of the resonance curve at the half-power points.

Figure 5:
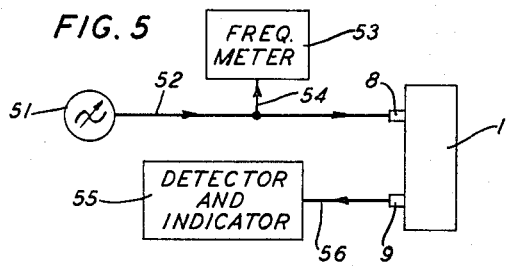
Figure 6:
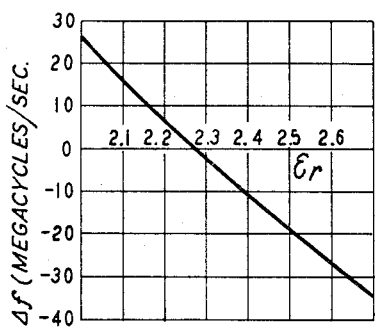
Figure 7:
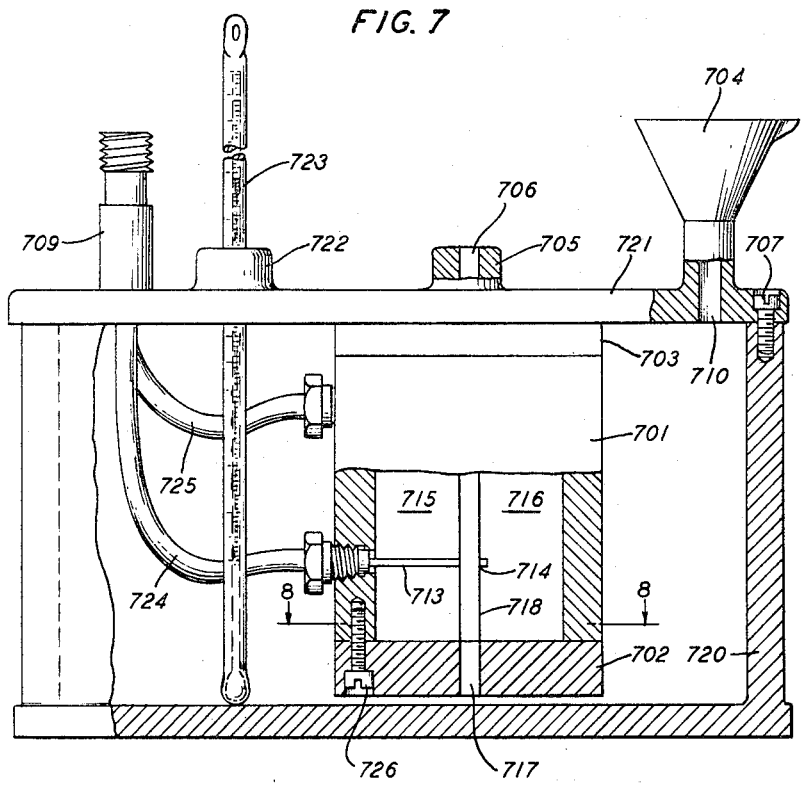
Figure 8:
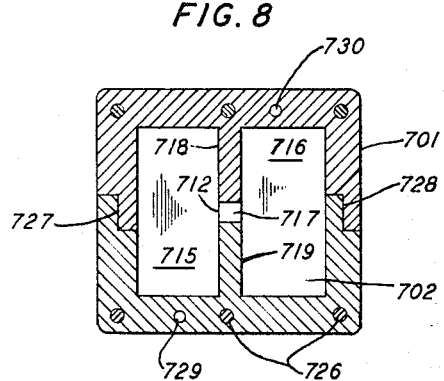

The invention may be better understood by reference to the accompanying drawings, in which:

FIG. 1 illustrates one embodiment of the invention;
FIG. 2 is a cross section view taken on the line 2—2 of FIG. 1;
FIG. 3 illustrates the general cross section configuration of a ridge waveguide;
FIG. 4 shows the equivalent electrical network of a ridge waveguide;
FIG. 5 is illustrative of a preferred form of measuring circuit used with the cavity resonator of this invention;
FIG. 6 illustrates a typical calibration curve for a resonant cavity of the type shown in FIG. 1;
FIG. 7 shows an alternative construction of a ridge waveguide in which the resonant cavity is enclosed in a liquid filled tank; and
FIG. 8 shows the cross section of the resonant cavity of FIG. 7 taken on the line 8—8.

The resonant cavity of FIG. 1 comprises a section of ridge waveguide 1 preferably permanently secured to a heavy base 2, the upper surface of which also comprises the lower end wall of the cavity. The term, "ridge waveguide" has the same meaning commonly attributed to it in the microwave art; that is, a waveguide structure having either of the two cross sections shown in Fig. 6.43 on page 358 of "Microwave Transmission Circuits," volume 9, Radiation Laboratory Series. The upper end of the cavity is closed by a top wall 3 which is secured to the cavity 1 by a plurality of screws 7. It is desirable that a suitable gasket be included between the top wall 3 and the cavity to prevent leakage of the liquid dielectric. This gasket is not shown but may comprise a conventional O-ring or a small rectangular groove around the top surface of cavity 1 in which may be inserted a length of solid round wire solder or similar deformable material which is compressible as the screws 7 are drawn down.

The cavity is filled with a liquid dielectric by way of a funnel 4 which leads into a tubular passageway in the wall of the cavity and may extend its full length. Lateral apertures, shown in FIG. 2, connect this tubular passageway with the cavity and permit the flow of the liquid dielectric into the cavity space. A specimen guide 5, having a rectangular hole 6, is secured to the top wall 3 with its hole precisely aligned with the gap between the ridges of the waveguide section. Hole 6 permits the entry of a test specimen and accurately guides it between the ridges in the waveguide. To prevent leakage of electric energy through hole 6, its length should be large compared to its largest transverse dimension. The longer hole also facilitates accurate guidance of the specimen in the ridge gap. It is preferable that the length of hole 6 be at least three times its transverse dimension. The upper surface of base 2 contains a similar rectangular hole extending only part way through the base and also in direct line with the gap between the waveguide ridges. The specimen, when inserted, passes down through the ridge gap and enters the opening in the top surface of base 2, thereby completely filling the ridge gap with the specimen. High frequency energy is supplied to the cavity by way of a conventional coaxial connector 8 and the amplitude of the response is determined by connecting a suitable detector and indicator to a similar coaxial connector 9.

The internal construction of the cavity is shown in FIG. 2. Here it will be seen that the cavity comprises two compartments or chambers 15, 16 separated by the centrally located ridges 18 and 19. The coaxial connector 9 is attached to the side wall of the cavity. A suitable gasket is included to prevent leakage of the liquid dielectric. Connector 8, not shown in FIG. 2, is similar to connector 9. The inner conductor 13 from the coaxial cable is carried across the cavity and is terminated at 14 through a hole in ridge 19. The ridge gap 12 is formed by the two opposing surfaces of ridges 18 and 19. The hole in the base 2 is shown at 17 and, as previously stated, this hole extends only part way through base 2. The tubular passageway 10 is connected to the funnel 4 of FIG. 1 and at least one aperture 11 connects passageway 10 to the cavity. This passageway is of sufficient diameter to receive a laboratory thermometer, not shown, which may be inserted through the funnel to measure the temperature of the liquid dielectric during test. To minimize the effect of apertures 11 on the magnetic field, it is preferable that they be located in the corner of the cavity as shown in FIG. 2 so that passageway 10 is also conveniently located in the corner of the cavity wall. While base 2 could be attached to the waveguide section 1 with screws in the same manner that the top 3 is secured, it is preferable that these parts be permanently attached by sweating or brazing. Also, while these parts could be made of any good conductive metal, it is preferred that all of the waveguide parts 1, 2 and 3 be made of oxygen-free high-conductivity copper. Their surfaces may also be gold plated to maintain good surface conductivity as well as freedom from corrosion.

FIG. 3 schematically illustrates the essential configuration of a ridge waveguide containing cavity compartments 315 and 316 corresponding to cavity compartments 15 and 16 of FIG. 2. Ridges 318 and 319 correspond to ridges 18 and 19 of FIG. 2 and the outer wall 301 corresponds to outer wall 1 of FIG. 2. The gap 312 has a thickness G and a width W. The principal cross section dimensions of the two cavity compartments are designated A and B, respectively. A unit length of such a configuration is known to have an equivalent inductance given by the following expression:

$$L = \mu(A-W)B/2 \quad (1)$$

and an equivalent capacitance in accordance with the following expression:

$$C = C_d + \epsilon W/G \quad (2)$$

Further information pertaining to these circuit parameters is given by Tsung-Shan Chen in "Calculation of the Parameters of Ridge Waveguides," I.R.E. Transactions on Microwave Theory and Techniques, January 1957, page 12. The equivalent circuit of the resonant cavity is illustrated in FIG. 4 where the lumped inductance and capacitance parameters are shown. Each of the inductances L is representative of the inductance of one of the two cavity chambers 315 and 316 of FIG. 3 and are expressed by Equation 1 above. The capacitance C, as expressed by Equation 2, is the capacitance of the gap 312. The discontinuity capacitance term $C_d$ represents the total fringe capacitance around the gap while the second term represents the direct capacitance within the gap. In the above expressions $\mu = 4\pi(10)^{-7}$ henries per meter and $\epsilon = 8.854(10)^{-12}\epsilon_r$ farads per meter, $\epsilon_r$ being the relative dielectric constant of the dielectric material in the gap of the cavity. The design of a practical cavity should result in the cross section of the waveguide being dimensioned to permit a test frequency greater than its cutoff frequency but substantially less than the self-resonant frequency of the $TE_{20}$ mode and a total capacitance C at least four times the fringe capacitance $C_d$.

A suitable circuit employing this invention is shown in block form in FIG. 5 where a high-frequency generator 51 is connected to the coaxial connector 8 by way of coaxial line 52. A frequency meter 53 is coupled to line 52 by way of line 54. A suitable detector and indicator 55 is coupled to coaxial connector 9 by way of coaxial line 56. Frequency generator 51, frequency meter 53 and detector and indicator 55 may be any apparatus suitable for the frequency range of the cavity. For example, when operating with a cavity resonant in the region of about 1600 mc. per second, generator 51 may be a Hewlett-Packard Model 614A oscillator. The frequency meter 53 may conveniently be a combination of the Hewlett-Packard Model 540A mixer and oscillator and a Hewlett-Packard Model 524B frequency counter. The detector and indicator 55 may be a Hewlett-Packard Model 415B square law detector and indicator. The practice of the invention, however, is not restricted to this particular apparatus as equivalent apparatus for this and other frequency ranges is commercially available.

In using the invention, the resonant frequency of the cavity without a specimen is determined by the frequency meter 53 when the frequency from generator 51 produces a peak in the detector and indicator 55. The specimen is then inserted in opening 6 as shown in FIG. 1, thereby displacing the liquid dielectric in the gap with the solid dielectric to be measured. If the liquid dielectric has a relative dielectric constant reasonably close to the dielectric constant of the specimen, as is generally the case with most practical substrate materials, the fringe capacitance represented by the term $C_d$ in expression (2) does not materially change. However, the direct capacitance in the gap represented by the second term of expression (2) will change, thereby changing the resonant frequency of the cavity. The relative dielectric constant is then directly obtained from a calibration curve such as shown in FIG. 6. This curve was drawn from data obtained when the liquid dielectric material was Dow-Corning 200 silicone having a relative dielectric constant of 2.274. The particular liquid dielectric used is not critical but one should be selected which does not attack or dissolve the test specimen. FIG. 6 gives directly the relative dielectric constant of the specimen for corresponding changes in frequency when the specimen is inserted.

The calibration curve shown in FIG. 6 may be obtained by calculation using the information given in the above-cited publication or it may be obtained by measuring the frequency changes produced by several solid dielectric materials of known dielectric constant, thereby establishing several points on the curve.

In the embodiment shown in FIGS. 1 and 2, the gap 12 as well as the specimen guide holes 6 and 17 are of square cross section. In this way, square specimens may be prepared from along the edges of the rather expensive substrate dielectric material. This material is usually wasted anyway in ordinary manufacturing processes so the specimens do not waste usable material. The relative dielectric constant that is measured by the cavity is in the direction normal to the surfaces of the ridges forming the gap, for that is the direction of the electric field in the gap. By turning the specimen 90 degrees and re-inserting it and again measuring the relative dielectric constant, anisotropy can be detected and quantitatively determined. By taking a second test specimen from the edge of the raw material at right angles to the edge from which the first sample was obtained a check of the relative dielectric constant across the thickness of the material can be had as well as a determination of the dielectric constant in its third dimension. As previously mentioned, the determination of the existence of anisotropy and of the actual values of the relative dielectric constants in the three orthogonal axes have become quite important in high frequency printed circuit applications.

FIG. 7 shows an alternative arrangement of the invention in which the waveguide cavity is submerged in a tank containing liquid dielectric. This embodiment is particularly useful at higher frequencies where the dimensions of the cavity are smaller. Resonant cavity 701 has a bottom wall 702 and a top wall 703 which may be secured together with a plurality of screws 726. This assembly may be secured to the tank top 721 by a plurality of screws, not shown. The top 721 is secured to its tank 720 by a plurality of screws such as screw 707. The resonant cavity may be excited by energy received over a coaxial line 725 and the resonant point determined by energy transmitted over the coaxial line 724, these being connected to a pair of coaxial connectors, such as connector 709, corresponding with connectors 8 and 9 of FIG. 1. As in the case of FIG. 2, the inner conductor 713 is terminated in one of the ridges, in this case ridge 718 at point 714. The two compartments 715 and 716 correspond with compartments 15 and 16 of FIG. 2. Liquid dielectric is poured into the tank 720 by way of funnel 704, the liquid entering through the funnel opening 710. The specimen is inserted into the ridge gap through a square guide hole 706 in specimen guide 705, the hole 706 being precisely aligned with the gap between the ridges. The lower wall 702 also has a guide hole 717 corresponding with opening 17 in the base 2 of FIG. 2. However, in this case the opening continues all the way through the base wall and it is through this opening that the liquid dielectric material may enter from tank 720 into the cavity compartments 715 and 716. A thermometer 723 is inserted in tank 720 through a thermometer well 722.

While the coaxial conductors have been terminated directly on the ridges as at 14 in FIG. 2 and 714 in FIG. 7, it is not essential that this mode of coupling be employed as other well known modes of coupling may be used instead. Typical of such other modes of coupling is the loop coupling such as shown on page 135 of "Introduction to UHF Circuits and Components" by Milton S. Kiver (1955).

A cross section taken on line 8—8 of the resonant cavity of FIG. 7 is shown in FIG. 8. Here is illustrated a preferred method of construction of such cavities showing that the waveguide 701 may be made in two parts joined at the irregular lines 727 and 728. Upon completion of the machining operations of each part, they may be sweated together and carefully cleaned before plating with gold. The screws for mounting the end wall 702 are illustrated at 726 and the guide hole 717 in the bottom wall 702 is clearly shown in alignment with the ridge gap 712. By using the lower guide hole 717 for filling the cavity, additional apertures, such as apertures 11 of FIG. 2, are unnecessary. The lower guide hole is effectively outside all cavity fields and, consequently, creates no disturbance of the wave energy in the cavity. A pair of dowel pins 729 and 730 are used to maintain alignment in accordance with conventional practice. The remaining reference numerals in this figure correspond with those in FIG. 7. The three principal parts of the resonant cavity, namely, the waveguide 701 and its end walls 702 and 703 are also preferably constructed of oxygen-free high-conductivity copper and, after fabrication, are carefully gold plated. Tank 720 and its top 721 may be constructed of any suitable metal, although brass is preferred. The operation of the cavity shown in FIG. 7 is identical to that previously described for FIG. 1.

In instances where it is unnecessary to determine the anisotropy of the dielectric specimen, the gap dimension W, as shown in FIG. 3, may be substantially larger than the gap thickness G. In all cases, the length of the waveguide section must be an integral number of half waveguide wavelengths at the desired test frequency, the waveguide wavelength being determined with the cavity filled with the liquid dielectric material. A cavity length of one waveguide wavelength is most practical and is preferred. The loss tangent of the specimens is readily determined by running a resonance curve in a conventional manner and computing the loss tangent from the width of this curve at the half-power points. As this is conventional procedure, further description thereof is unnecessary in this specification.

While it is preferred that the waveguide be of the double or symmetrical ridge type, it is quite possible to practice the invention with the single or unsymmetrical ridge type. These two waveguide types are illustrated in the above-cited Chen article and also in Reference Data for Radio Engineers, 4th ed., page 626.

What is claimed is:

1. A resonant cavity to operate in the $TE_{10}$ mode for measuring dielectric properties of solid materials, said cavity comprising a section of ridge waveguide having a length approximating an integral number of one-half waveguide wavelengths at the desired test frequency and a ridge gap extending the full length of said section; the cross section of the waveguide being dimensioned so that the test frequency is greater than the cross section cutoff frequency and less than the self-resonant frequency of the $TE_{20}$ mode, an end wall on each end of said waveguide section, an opening of square cross section through one of said walls in alignment with the gap to receive a test specimen having substantially the same cross section dimensions as said opening so that said specimen may be guided into and completely fill said gap, means for filling said cavity with a liquid dielectric material, a coupling means for exciting said cavity with electric energy, and means for coupling a detector to said cavity to measure the amplitude and frequency of the resonant energy in said cavity.

2. The combination of claim 1 wherein the gap formed by the ridge of said waveguide is dimensioned to have a total capacitance at least equal to four times its fringe capacitance.

3. The combination of claim 1 wherein the length of said waveguide section is equal to one waveguide wavelength at the desired test frequency.

4. The combination of claim 1 wherein said section of ridge waveguide is of the double ridge type.

5. The combination of claim 1 wherein the section of waveguide has a wall thickness sufficient to include a tubular passageway in an outer corner thereof and substantially parallel with its length and the means for filling said cavity comprises said passageway and at least one aperture located in said corner and extending through said wall connecting said passageway with said cavity.

6. The combination of claim 1 wherein said means for filling said cavity comprises a tank in which said waveguide section may be placed, means for admitting the dielectric material to said tank, and an aperture through the lower end of said cavity permitting the liquid to flow from said tank to said cavity.

References Cited

UNITED STATES PATENTS

| | | | |
|---|---|---|---|
| 2,463,297 | 3/1949 | Muskat et al. | 324—58.5 |
| 2,474,260 | 5/1949 | Leef | 324—58.5 |
| 2,496,772 | 2/1950 | Bradley | 333—83 |
| 2,548,598 | 4/1951 | Feiker | 324—58.5 |
| 2,567,921 | 9/1951 | Boehm | 324—61 X |
| 2,704,830 | 3/1955 | Rosecrans | 333—83 |
| 3,077,565 | 2/1963 | Riblet | 333—83 X |
| 3,122,703 | 2/1964 | Rempel et al. | 324—58.5 X |
| 3,271,667 | 9/1966 | Czerlinsky | 324—58 |

OTHER REFERENCES

"Improved Re-Entrant Cavity," General Electric Review, September 1947, pages 34–39.

Technique of Microwave Measurement, text by Montgomery et al., MIT Radiation Lab. Series, vol. 11, McGraw-Hill, 1947, pages 660–666.

"Resonant Cavity Measurements," article by Sproull and Linder, Proceedings of the I.R.E. and Waves and Electronics, May 1946, pages 305–312.

"Microwave Technique for the Measurement of Dielectric Constant of Fibers and Films of High Polymers," Journal of Applied Physics, vol. 21, No. 10, October 1950, pp. 956–961.

"A Method for Measuring the Dielectric Constants of Solids at Ultrahigh Frequencies," The Review of Scientific Instruments, vol. 25, No. 9, September 1954, pp. 925–926.

RUDOLPH V. ROLINEC, *Primary Examiner.*

WALTER L. CARLSON, *Examiner.*

A. E. RICHMOND, P. F. WILLE, *Assistant Examiners.*